(12) United States Patent
Nguyen et al.

(10) Patent No.: US 12,278,742 B2
(45) Date of Patent: *Apr. 15, 2025

(54) SYSTEMS AND METHODS FOR AUTOMATED VERIFICATION AND RECONFIGURATION OF DISCONNECTED NETWORK DEVICES

(71) Applicant: Level 3 Communications, LLC, Denver, CO (US)

(72) Inventors: Brian V. H. Nguyen, Thornton, CO (US); Shellie Wickham, Brighton, CO (US)

(73) Assignee: Level 3 Communicatios, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/777,096

(22) Filed: Jul. 18, 2024

(65) Prior Publication Data

US 2024/0372790 A1 Nov. 7, 2024

Related U.S. Application Data

(63) Continuation of application No. 18/237,647, filed on Aug. 24, 2023, now Pat. No. 12,047,257, which is a continuation of application No. 17/976,323, filed on Oct. 28, 2022, now Pat. No. 11,743,146, which is a continuation of application No. 17/712,634, filed on Apr. 4, 2022, now Pat. No. 11,489,740, which is a continuation of application No. 17/015,135, filed on Sep. 9, 2020, now Pat. No. 11,303,542, which is a continuation of application No. 16/034,707, filed on Jul. 13, 2018, now Pat. No. 10,778,541.

(60) Provisional application No. 62/534,564, filed on Jul. 19, 2017.

(51) Int. Cl.
*H04L 41/5054* (2022.01)
*H04L 41/0659* (2022.01)

(52) U.S. Cl.
CPC ...... *H04L 41/5054* (2013.01); *H04L 41/0661* (2023.05)

(58) Field of Classification Search
CPC .................. H04L 41/5054; H04L 41/0661
See application file for complete search history.

(56) References Cited

U.S. PATENT DOCUMENTS

| 6,857,009 | B1 | 2/2005 | Ferreria |
| 7,240,364 | B1 | 7/2007 | Branscomb |
| 7,526,536 | B2 * | 4/2009 | Bhogal ............... H04L 67/125 |
| | | | 709/227 |

(Continued)

*Primary Examiner* — Joe Chacko (57) ABSTRACT

Systems and methods of disconnecting a network service provided over a network service path include using a computing device that obtains a service identifier assigned to network service and identifies a port of a network device included in a network service path associated with the service. The computing device transmits a request to the network device for port configuration data of the network device and based on the received port configuration data, determines whether the port is assigned to the network service. If so, the computing devices executes a remediation operation which includes transmitting a reconfiguration command to the network device that is adapted to cause the network device to update the port configuration data to free the port.

16 Claims, 4 Drawing Sheets

(56) References Cited

U.S. PATENT DOCUMENTS

| | | |
|---|---|---|
| 2006/0056293 A1* | 3/2006 | Kumagai ............... H04L 43/00 370/229 |
| 2006/0230126 A1* | 10/2006 | Bhogal ................. H04L 67/125 709/220 |
| 2006/0277275 A1 | 12/2006 | Glaenzer |
| 2007/0019745 A1 | 1/2007 | Donadio |
| 2010/0287227 A1* | 11/2010 | Goel ....................... H04L 67/56 709/202 |
| 2013/0007183 A1 | 1/2013 | Sorenson |
| 2019/0028365 A1 | 1/2019 | Nguyen et al. |
| 2019/0273757 A1 | 9/2019 | Brandwine |
| 2019/0373651 A1 | 12/2019 | Li |
| 2020/0403889 A1 | 12/2020 | Nguyen |
| 2022/0224609 A1 | 7/2022 | Nguyen |
| 2023/0048190 A1 | 2/2023 | Nguyen |
| 2023/0396520 A1 | 12/2023 | Nguyen |

\* cited by examiner

SYSTEMS AND METHODS FOR AUTOMATED VERIFICATION AND RECONFIGURATION OF DISCONNECTED NETWORK DEVICES

TECHNICAL FIELD

Aspects of the present disclosure generally relate to disconnection of network services provided over telecommunication networks and, more particularly, to systems and methods for automatically verifying disconnection of network devices previously used to provide network services that have since been disconnected and reconfiguring such network devices if not fully disconnected.

BACKGROUND

Telecommunications networks include multiple interconnected network devices configured to transport signals and data across the network. Network services are provided over network service paths defined between endpoint devices of the network. In addition to the endpoint devices, the network service path may include one or more intermediate network devices.

Devices within a network are generally arranged according to physical and logical topologies. The physical topology provides for the placement of devices within the network and specifies details such as the physical location and cabling of the network. The logical topology, on the other hand, provides how data flows within the network. Accordingly, a network service path extending through the network is defined by each of the physical and logical interconnections of network devices along the network service path.

During commissioning of a network service, both the physical and logical paths corresponding to the network service path are established. For example, to the extent network devices along the network service path are not physically connected, cabling may be run between the network devices to establish a physical connection. In many instances, new cabling is only required to connect endpoints to existing physical infrastructure. Similarly, data flow paths between the network devices may be defined by specifying ports of the network devices responsible for transmitting and receiving data. Accordingly, to disconnect a network service such that the resources associated with the network service are available for reuse, both the physical and logical paths of the network service path must be properly decommissioned. Moreover, to the extent one or more systems are used to track network services, inventories and usage of network devices, and the like, such systems should be promptly and accurately updated to reflect the resources freed as a result of the service disconnection. By doing so, the freed resources can be readily reused to provision other network services.

It is with these observations in mind, among others, that aspects of the present disclosure were conceived.

SUMMARY OF THE DISCLOSURE

In one implementation of the present disclosure, a method of disconnecting a network service provided over a network service path using a computing device including a processor is provided. The method includes, obtaining, by the computing device, a service identifier assigned to the network service and identifying a port of a network device included in the network service path using the service identifier. The method further includes transmitting a request to the network device for port configuration data of the network device and receiving, in response to the request, the port configuration data of the network device at the computing device. The computing device determines that the port is assigned to the network service from the port configuration data and executes a remediation operation. The remediation operation includes transmitting a reconfiguration command to the network device that is adapted to cause the network device to update the port configuration data to free the port.

In another implementation of the present disclosure, a method of disconnecting network services provided over one or more networks is provided. Each network service is associated with a service identifier and the method is executable by a computing device communicatively coupled to the one or more networks. The method includes, for each disconnected network service, retrieving network service path data for a network service path previously used to provide the disconnected network service, the network path data including a port identifier corresponding to a port along the network service path. A network device including the port is then identified by querying an inventory database using the port identifier, the inventory database storing a list of network devices and port identifiers associated with each of the network devices. The method further includes transmitting a request to the network device, the request configured to automatically cause the network device to retrieve port configuration data of the network device and transmit the port configuration data to the computing device and receiving the port configuration data in response to transmitting the request. The method then includes determining from the port configuration data that the port is still assigned to provide the disconnected network service. In response to such a determination, a reconfiguration command is transmitted to the network device that causes the network device to update the port configuration data to free the port.

In yet another implementation of the present, a system for disconnecting network services in a telecommunications network is provided. The system includes a computing device communicatively couplable to a plurality of storage systems and a network for providing network services. The computing device is configured to obtain a service identifier assigned to the network service and to identify a port of a network device included in the network service path using the service identifier. The computing device is further configured to transmit a request to the network device for port configuration data of the network device and to receive, in response to the request, the port configuration data of the network device. The computing device then determines that the port is assigned to the network service from the port configuration data and executes a remediation operation in response. The remediation operation includes transmitting a reconfiguration command to the network device that causes the network device to update the port configuration data to free the port.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however the emphasis instead is being placed on illustrating the principles of the inventive concepts. Also, in the drawings the like reference characters may refer to the same components or similar throughout the different views. It is intended that the embodiments and figures disclosed herein are to be considered illustrative rather than limiting.

DETAILED DESCRIPTION

This patent application involves, among other things, systems and methods for automated verification and reconfiguration of disconnected network devices. In general, the systems and methods disclosed herein determine whether network resources used to provide a network service are fully unassigned in response to a request to disconnect the network service. If a resource is not fully unassigned, reconfiguration is automatically initiated to properly free the resource. To do so, each network device associated with provision of the network service is audited by a computing device to determine if the physical and logical resources of the network device have been properly freed. To the extent either a physical or logical resource is identified as being improperly assigned to a network service, the computing device transmits a reconfiguration message to the network device that causes the network device to automatically reconfigure itself to free the physical and/or logical resource.

Disconnection of a network service generally requires releasing all network resources used to provide the network service and updating any systems used to track usage of the network resources to reflect the disconnection. More specifically, releasing network resources involves decommissioning a network service path from both a physical and logical perspective and ensuring that the physical and logical resources freed by the decommissioning process are properly indicated as freed within inventory or similar tracking systems. For example, disconnecting the network service may include both physically disconnecting network devices, such as by removing cabling, and logically disconnecting network devices, such as by reassigning or freeing ports of the network devices used to transmit data associated with the network service.

When properly disconnected, the resources employed by the disconnected network service are freed to be reused to provision other network services. However, given the complexity of telecommunications networks and the potential for operator error (such as failure to fully and properly perform disconnection tasks, including updating databases or other information sources indicating the availability of network resources), network resources that should be released as a result of disconnecting a given network service may not be properly freed or, if freed, may not be properly identified as available for reuse.

Improperly identifying a network resource as unavailable negatively impacts both financial and performance aspects of a network. First, the network paths leading to and from the resource go unused. As a result, revenues associated with the network resource are no longer realized. Moreover, in many instances, costs associated with maintaining the network resource are nevertheless accrued. Second, the unused resource may also impact network performance by foreclosing optimal network service paths for delivering network services. For example, the network resource may lie along the most efficient network service path to provide a second network service. As a result, provisioning of the second network service may only be possible over a less efficient network service path, thereby impacting the overall performance of the second network service and the broader network as a whole.

In implementations of the present disclosure, a service identifier corresponding to a network service marked for disconnection (for example, a network service that is identified as previously disconnected or pending disconnection) is received at a computing device, referred to herein as a disconnection verification computing device, of a telecommunications network. The disconnection verification computing device retrieves a network service path corresponding to the network service and identifies both the physical and logical resources along the network service path. The disconnection verification computing device then determines the status of each resource and, more specifically, whether the resource has been properly disconnected. To the extent a resource has not been properly disconnected, the disconnection verification computing device performs one or more remedial operations. Such remedial operations may include the disconnection verification computing device generating an alert, message, or similar notification indicating the presence of the discrepancy. The notification may then be transmitted by the disconnection verification computing device to a suitable system for processing. For example, the notification may be used as or used to generate a ticket to be reviewed and handled by information technology or maintenance personnel. Remedial measures may also include the disconnection verification computing device automatically generating and transmitting a configuration message to the network device(s) associated with the discrepancy. The configuration message may then automatically reconfigure the network device to free the resource for use in provisioning a second network service.

Figure 1:
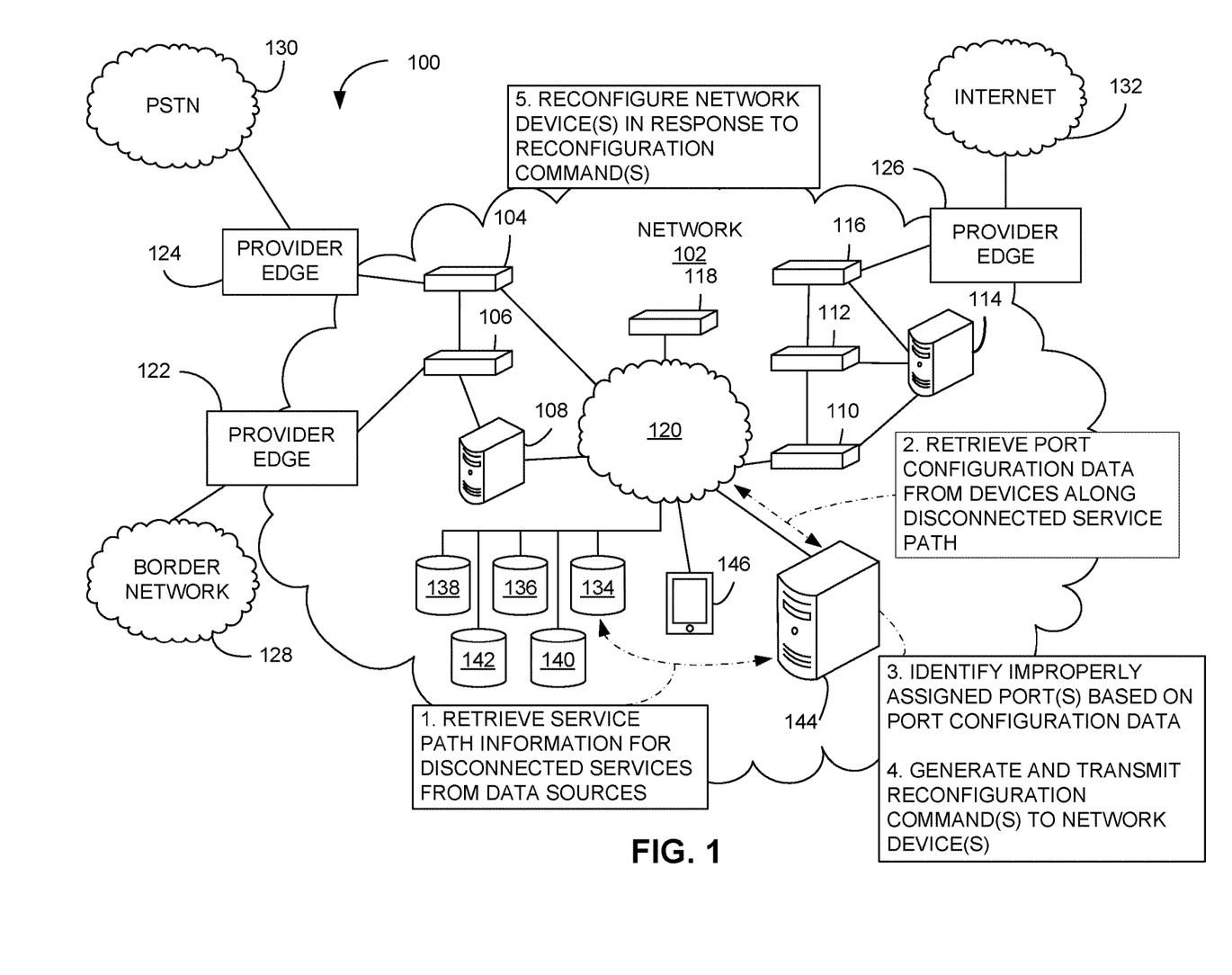
FIG. 1 is a schematic illustration of an example network environment, including a disconnection audit computing device.

FIG. 1 is a schematic illustration of an example network environment 100. In one implementation, a network 102 includes multiple interconnected network devices 104-118. The network 102 may include any number of network devices, as indicated by a sub-network 120 to which each of network devices 104-118 are connected either directly or indirectly. Network devices 104-118 may include, without limitation, servers, routers, switches, server appliances, storage libraries, termination panels, patch panels, and the like, which enable communication and/or provide services across the network 102. It should be appreciated that the embodiments of the present disclosure may be utilized in any type of network, including but not limited to, a content distribution network (CDN), a Voice over Internet Protocol (VOIP) network, a domain name server (DNS) network, an enterprise network, a backbone network, and the like. It should further be appreciated that portions of the network may operate using various types of routing including, without limitation, IP-based and non-IP-based routing. For example, the network 102 may include devices utilizing time division multiplexing (TDM) or plain old telephone service (POTS) switching if employed for voice communication. In general, the network 102 of FIG. 1 may include any communication network devices known or hereafter developed.

As shown in the network environment 100, the network 102 is coupled to various external networks via provider edge devices 122-126. The provider edge 122 is communicatively coupled to a border network 128 that may be provided and maintained by a business or organization, such as a local telephone company or cable company, and which provides network/communication-related services to customers of the local telephone/cable company. The provide edge 124, in contrast, may correspond to a media gateway device or a session border controller (SBC) that is coupled to a public switched telephone network (PSTN) 130 operated by a local exchange carrier (LEC). The provider edge 126, in further contrast, exchanges communications and/or access content from a public network, such as the Internet 132.

The network 102 is generally used to provide one or more network services that require transmission and routing of data through the network 102 and, more specifically, between endpoints of the network 102 along a network service path. For purposes of this disclosure, the term endpoint is used to refer to an initial location and a destination (which may be physical or logical) within a network used to provide a network service. Accordingly, at least one of the initial location and the destination corresponds to a network device, such as the provider edges 122-126, that interfaces with external networks or devices. The paths between endpoints used to provide network services are referred to herein as network service paths. Network service paths generally include both physical and logical paths. The physical path defines the physical relationships between the network devices used to implement the network service path. The logical path, in contrast, defines the logical interconnections between the network devices and describes the manner in which data flows along the network service path.

Provisioning a network service generally requires establishing both the physical path (such as by physically connecting the network devices along the path) and the logical path (such as by mapping ports of the network devices) that define the network service path. Similarly, full disconnection of a network service, such that the corresponding resources are freed for use in provisioning another service, requires decommissioning each of the physical and logical paths.

To facilitate operation and maintenance of the network 102, one or more databases may be maintained that contain data related to services provided over the network 102, the equipment used to provide such services, and operations undertaken with respect to the network 102. Such information may be used to determine, among other things, the status and use of resources within the network 102, the capacity of the network 102 to handle additional network services, how best to route new and existing network services, and the specific network devices used to provide existing network services over the network 102. The network 102, for example, includes each of a service database 134, an inventory database 136, a workflow database 138, and a workflow ticket database 140.

In the implementation shown in FIG. 1, the service database 134 stores information corresponding to network services provided over the network 102. For example, each record within the service database 134 may include a service identifier corresponding to a particular network service. Each record may further include details regarding the service associated with the service identifier including, without limitation, the status of the service, the type of service, customer details, and the like. The inventory database 136 includes information regarding the network devices within the network 102. Such information may include, without limitation, a network device type, services provided using the network device, a logical address of the network device, details regarding logical interconnections made through the network device, and the like. In implementations in which records of the inventory database 136 indicate services provided using network devices corresponding to the records, such records may be stored using the service identifiers associated with the particular service. The workflow database 138 may include predefined task lists for completing operations associated with the network 102, such as adding new network devices, provisioning new network services, and disconnecting existing network services. Finally, the workflow ticket database 140 may include a list of issued "tickets" corresponding to tasks that have been initiated, including the status of such tasks. The network 102 may further include one or more additional data sources 142 for storing additional data relevant to the operation of the network 102, including data related to cost, performance, and efficiency of the network 102. The databases 134-142 may be implemented by and distributed among one or more computing or data storage systems in any suitable format.

As network services are implemented and disconnected, the corresponding information in the databases 134-142 may not be updated correctly or may not be updated at all. In the context of service disconnections, such errors and omissions may lead to network resources being considered active and in use when they are actually free and able to be used to provision other network services or to reroute existing services along more efficient network service paths. As a result, the network 102 may be underutilized. Over time such errors and omissions may collectively result in significant financial and performance losses associated with operating the network 102.

To address the problems associated with capturing service disconnections, the network environment 100 includes a disconnection verification computing device 144 configured to automatically identify incomplete network service disconnections. The disconnection verification computing device 144 collects data stored in the databases 136-142 and determines whether the network service path for a discontinued network service has been freed from both a physical and logical perspective.

The disconnection verification computing device 144 may also be communicatively coupled to one or more remote computing devices 146. In certain implementations, the remote computing devices 146 are computing devices associated with technicians, network engineers, or other personnel responsible for maintaining and monitoring operations of the network 102, including configuring the network devices 104-118 and inputting and/or maintaining data in the databases 136-142. Accordingly, to the extent the disconnection verification computing device 144 identifies issues regarding disconnection of network services, the disconnection verification computing device 144 may transmit alerts or messages to the remote computing devices 146 to indicate that remedial action is required.

In certain implementations, the disconnection verification computing device 144 may automatically generate and transmit reconfiguration messages to the network devices 104-118 in response to identifying that physical or logical resources associated with one of the network device 104-118 have not been properly released. When received by a target network device of the network devices 104-118, the reconfiguration message may automatically cause the target network device to execute one or more commands or scripts contained within the reconfiguration message. The commands or scripts may in turn cause the target network device to modify configuration data including, but not limited to, one or more of device settings and a routing table of the network device. For example, the commands or scripts may clear an entry in a routing table corresponding to a port assignment that should have previously been cleared as part of a service disconnection.

Figure 2:
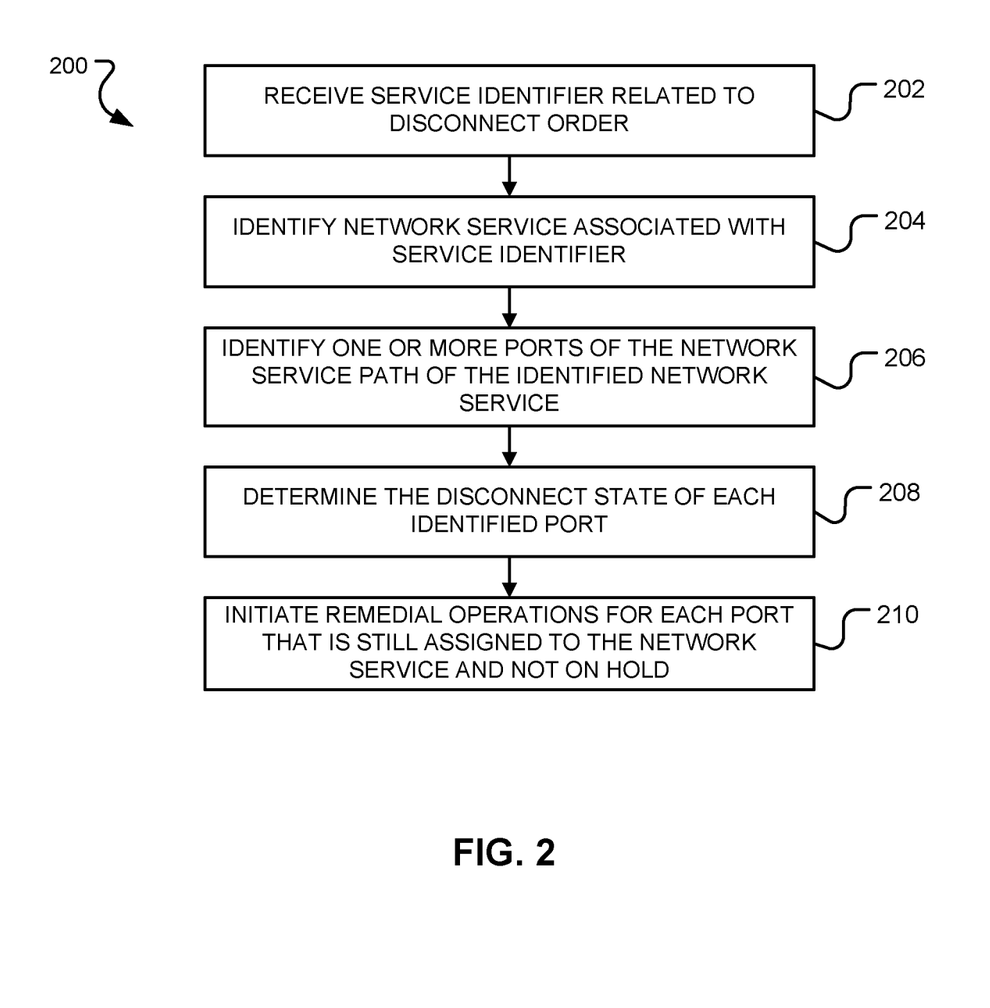
FIG. 2 is a flowchart of a first method, or combination of methods, for auditing network service disconnections.

FIG. 2 is a flow chart illustrating a first method 200 by which a disconnection verification computing device, such as the disconnection verification computing device 144 of FIG. 1, identifies and addresses incomplete service disconnections. With reference also to FIG. 1, the disconnection verification computing device 144 is provided a service identifier corresponding to a network service for which a disconnect order has been received (operation 202). Accordingly, the service identifier may correspond to a network service that has been previously disconnected or a network service for which disconnection is currently pending.

The disconnection verification computing device 144 then identifies the service associated with the service identifier and the network service path used to provide the service (operation 204). For example, in certain implementations, the disconnection verification computing device 144 retrieves details regarding the network service from the service database 134 and determines the network service path based on information included in the inventory database 136. Alternatively, the service database 134 or a separate network service path database may store network service paths for each service implemented over the network 102.

After acquiring the network service path, the disconnection verification computing device 144 may identify one or more ports of the network service path (operation 206) and determine a disconnect state for each of the identified ports (operation 208). Determining the disconnect state of a port may include each of determining whether the network device associated with the port has been physically disconnected from the network service path and whether the necessary logical changes have been implemented to free the port.

To determine whether the logical changes have been made to free the port, the disconnection verification computing device 144 transmits a request to the network device associated with the port. The request may include a command or script executable by the network device that, when executed by the network device, causes the network device to retrieve port configuration data of the network device and to transmit the port configuration data in a response message to the disconnection verification computing device 144.

The port configuration data generally includes a listing or sub-listing of the ports of the network device. The port configuration data may further include, among other things, status indicators, port labels, port mappings, or other data indicating properties or characteristics of each port contained in the port configuration data. For example, in certain implementations, the port configuration data may include a port label for each port that includes an identifier from which a service provided using the port may be identified. The port configuration data may further include a status indicator that may be used to indicate, among other things, whether the port is currently free, assigned to provide a service, or placed on hold.

In one implementation, determining the disconnect state of a port may include determining whether the port and/or the network device including the port has been temporarily placed on hold. A hold may be implemented, for example, if a network service is temporarily taken offline but is anticipated to be reinstated at a future time. As a result, the network service path may be maintained such that reactivation of the network service requires minimal intervention. To facilitate a hold check, the inventory database 136 may include a field indicating the hold status of the port or network device. As a result, the disconnection verification computing device 144 may perform a lookup using an identifier associated with the port to determine whether the port or network device is currently on hold.

Determining the disconnect state may also include determining whether the port and/or the network device including the port has been reassigned to a different network service. In such a situation, it is generally undesirable to disconnect the port or network device as doing so would disrupt the new service. To facilitate a re-use check, the inventory database 136 may include a field indicating the specific service to which the port or network device is assigned. The disconnection verification computing device 144 may then perform a lookup using an identifier associated with the port to determine the currently assigned service and compare the currently assigned service to the service for which the disconnection verification is being conducted. To the extent the services are different, the port or network device may be considered reassigned.

From a logical perspective, determining the disconnect state may include retrieving configuration information from the network device associated with the port. Such information may include, without limitation, a port status, a port label, and a cross-connect assignment including the port.

A port status may indicate whether the port is currently active/assigned or inactive/unassigned. If the port is unassigned, the port may be considered logically disconnected. However, if the port is assigned, the port label may be used to identify the network service associated with the port. For example, the port label may include a service identifier, such as a service identifier listed in the service database 134 (shown in FIG. 1), corresponding to the network service delivered through the port. Alternatively, the port label may include a port identifier from which the disconnection verification computing device 144 identifies the network service associated with the port, such as by performing a lookup in one of the databases 134-142, and determines whether the network service indicates that the port has been reassigned.

In certain implementations, the port configuration data may include some or all of a cross-connection table or similar data structure of the network device. A cross-connection table generally provides a mapping of ports across a network device. In other words, a network device may include a first set of ports and a second set of ports that may be connected through the network device. A cross-connection table of the network device provides a listing of pairings between the first set of ports and the second set of ports. So, for example, the cross-connection table may include a full listing of the first or second set of ports and their paired ports of the second or first set of ports, respectively (or a suitable indicator if a port is unpaired). Alternatively, the cross-connection table may list only pairs of ports, omitting any ports that are unpaired.

To the extent the retrieved port configuration data includes a cross-connection table, determining whether a port is assigned may include determining if the port is included in the cross-connection table or is indicated in the cross-connection table as being cross-connected with a second port of the network device. If the port is indicated as being connected to a second port, the disconnection verification computing device 144 may further determine whether the second port is also part of the disconnected network service path, such as by performing a corresponding lookup in the databases 134-142 containing network service and network equipment data. If both ports are associated with the network service path of the disconnected service, the disconnection verification computing device 144 may also analyze the second port to determines its state and perform any necessary remedial actions (as described below in more detail) to correct the port configuration data in the event the second port should be freed.

To the extent the disconnect state of the port indicates that the port is still assigned to the network service and not otherwise placed on hold, the disconnection verification computing device 144 may initiate one or more remedial operations (operation 210). The remedial operations generally include completing disconnection of the port or network device including the port and updating a corresponding inventory or similar database to reflect the disconnection.

In one implementation, a remedial operation may include transmitting an alert or similar message to the remote computing device 146 indicating that the port had not been fully disconnected. In such implementations, the disconnection verification computing device 144 may further generate one or more remediation tickets corresponding to necessary tasks required to disconnect the port and add the remediation tickets to the workflow ticket database 140. In response to the ticket being completed, the disconnection verification computing system 144 may then update the inventory to reflect that the port and/or network device are now available.

As another example of a remedial operation, the disconnection verification computing device 144 may transmit a reconfiguration message including one or more scripts or commands to a network device associated with a port that should be unassigned/disconnected. When received by the network device, the reconfiguration message causes the network device to automatically execute the commands of the reconfiguration message. The commands generally cause the network device to reconfigure itself to free the incorrectly assigned port. Such reconfiguration may include, without limitation, one or more of changing settings of the network device and modifying a routing table or similar data stored within the network device. For example, the commands may cause the network device to clear an entry within a routing table corresponding to the freed port. The commands may further cause the network device to generate and transmit a response message to the disconnection verification computing device 144 indicating whether the reconfiguration was successful. In certain implementations, the response message may include the updated settings or data stored of the network device such that the reconfiguration can be verified by the disconnection verification computing device 144.

Figure 3:
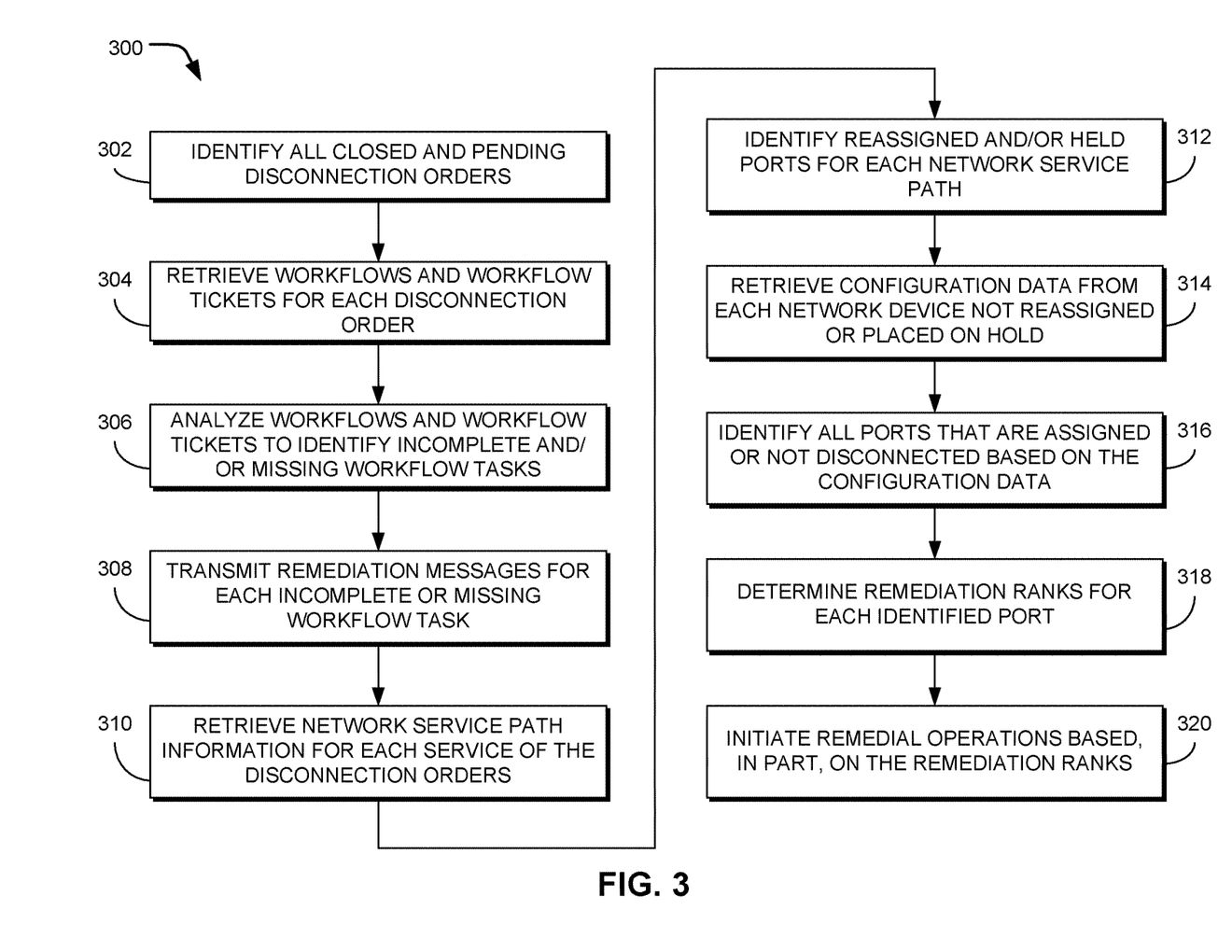
FIG. 3 is a flowchart illustrating a second method, or combination of methods, for auditing network service disconnections.

FIG. 3 is a flow chart illustrating an alternative method 300 for verifying network service disconnections, which may be implemented using a disconnection verification computing device, such as the disconnection verification computing device 144 of FIG. 1.

With reference to FIG. 1, the method 300 includes identifying all closed or pending disconnection orders for a network 102 (operation 302). For example, the disconnection verification computing device 144 may execute a query on the service database 134 to identify any network services with a status indicating that the network service has been, is in the process of, or is to be disconnected.

For each service identified as part of operation 302, a corresponding list of disconnection workflow tasks and tickets may be retrieved from the workflow database 138 and the workflow ticket database 140, respectively (operation 304). For each network service identified in operation 302, the disconnection verification computing device 144 may then analyze the tickets obtained from the workflow ticket database 140 to determine whether the tickets have been completed, to determine whether tickets corresponding to necessary workflow tasks are missing or were never issued, or to otherwise identify inconsistencies between the necessary workflow for disconnecting each network service and the actual issued tickets (operation 306). To the extent any such discrepancies are identified, the disconnection verification computing device 144 may transmit an alert or similar remediation message identifying the network service and/or specific tasks to the remote computing device 146 (operation 308).

The disconnection verification computing device 144 may then retrieve network service path information for the identified network services (operation 310). The network service path information generally includes both physical path information (such as the network devices included in the network service path) and logical path information (such as the chain of ports used to provide the network service path). In certain implementations, the entry for each service included in the service database 134 may include network service path data for the network service path along which the respective service is provisioned. For example, entries of the service database 134 corresponding to a particular service identifier may include a list of network device identifiers corresponding to the physical chain of network devices used in provisioning the service and a list of port identifiers or labels corresponding to the logical chain of ports used in provisioning the service. Alternatively, one or more separate data sources may be used to store the physical and logical path information associated with each service included in the service database 134. To facilitate searching, the entries of the one or more separate data sources may include and be organized based on the service identifier associated with the network path information. Accordingly, to obtain the network service path information for a service, the disconnection verification computing device 144 may query the service database 134 or other data sources containing the network path information using the service identifier associated with the service of interest.

For each port identified during operation 310, the disconnection verification computing device 144 identifies each port that has been reassigned to provide a second network service or placed on hold (operation 312). In one implementation, the disconnection verification determines whether the port has been reassigned or is otherwise being reused by conducting a search of known network service paths using each of a device identifier associated with the network device to which the port belongs and a port identifier associated with the port. In other words, the disconnection verification computing device 144 determines whether unique identifiers associated with the network device and the port appear in one or more other network service paths. If one or more second services are identified, the disconnection verification computing device 144 may generate an alert or other message identifying the conflict and transmit the message to a network operator for further investigation and remediation.

The disconnection verification computing device 144 may also determine whether the port or network device has been placed on hold. Such a hold may be used to, among other things, preserve a network service path despite disconnection of a corresponding service previously provided over the disconnected network service path. For example, if an operator knows that a service will be only temporarily disconnected a hold may be placed on the ports or network devices of the corresponding network service path to preclude reassignment of the ports or network devices, thereby facilitating reinitiation of the service. In certain instances, whether a hold has been applied to a particular piece of network equipment or a specific port may be indicated in the inventory database 136 or a separate hold list. Accordingly, the disconnection verification computing device 144 may determine whether a particular port or network device is placed on hold by querying the inventory database 136 or hold list using identifiers associated with the network device and/or port. To the extent a particular port has been placed on hold, no additional investigation is conducted by the disconnection verification computing device 144.

For any ports that have not been reassigned or placed on hold, the disconnection verification computing device 144 retrieves configuration data from the network device associated with the port, the configuration data including, without limitation, listings of one or more of port statuses, port labels, and cross-connections of the network device (operation 314). To do so, the disconnection verification computing device 144 generates a configuration data request message and transmits the request message to each network device. When received by a network device, the request message causes the network device to execute a script or similar series of commands stored within the message. In certain implementations, the commands cause the network device to retrieve configuration or other internal data of the network device, generate a response message including the retrieved data, and transmit the response message back to the disconnection verification computing device 144.

The physical and logical information for each network service is then analyzed by the disconnection computing device 144 to identify ports that are improperly assigned or otherwise not disconnected (operation 316). Examples of methods for conducting such analyses are discussed with respect to the method 200 of FIG. 2.

In certain implementations, the disconnection verification computing device 144 may rank the services found to be improperly or incompletely disconnected in order to prioritize their remediation (operation 318). For example, in certain implementations, the disconnection verification computing device 144 may calculate a cost associated with a port or network device found to be active despite a disconnection order. Such cost calculations may be made by determining a transport distance between the network device and neighboring network devices of the network 102 and multiplying the transport distance by an estimated transport cost per unit of transport distance to obtain a total transport cost. In other implementations, similar transport costs may be determined for larger circuits that may be foreclosed by the unavailable port or network device. The results obtained in operation 318 may be stored and/or used to generate a report or perform other analytics.

Following operation 314, remedial operations may be initiated by the disconnection verification computing device 144 (operation 320). As previously discussed in the context of the method 200 of FIG. 2, such remedial operations may include generating messages (including alerts or tickets) and sending the messages to the remote computing device 146. Remedial operations may also include generating reconfiguration messages including scripts or commands to be sent to and executed by network devices. In certain implementations, the remedial operations may incorporate the rankings generated during operation 318. For example, as part of the remedial operations, the report generated during operation 318 may be transmitted to the remote computing device 146. Tickets generated by the disconnection verification computing device 144 may also be assigned a priority or otherwise ordered based on the results of operation 318. For example, each ticket may be assigned a priority or category by the disconnection verification computing device 144 based on the costs or lost revenue associated with leaving the ticket unresolved.

In certain implementations of the present disclosure, the disconnection verification computing device 144 may be configured to record or otherwise maintain data corresponding to improperly disconnected network services in a log, a database, or some other data source. Such information may then be accessed using the disconnection verification computing device 144 or a remote computing device in communication with the data source to analyze the recorded data. Such analysis may enable the identification of root causes of failures to completely disconnect network services and the subsequent addressing of the root causes, such as by providing additional training to personnel involved in disconnecting network services, improving workflows associated with disconnecting network services, or taking similar remedial steps.

To facilitate such actions, the disconnection verification computing device 144 may log or otherwise store data corresponding to any incomplete disconnections that it identifies. Such information may include network information corresponding to the incompletely disconnected service such as, without limitation, one or more of the network device, the port, the network service path, and the network service type associated with the incompletely disconnected service. The information may also include information regarding the disconnection workflow associated with the improperly disconnected service. For example, when the disconnection verification computing device 144 identifies an incomplete disconnection workflow ticket, the disconnection verification computing device 144 may record, without limitation, one or more of an identifier assigned to the ticket, a name/employee identifier of the operator tasked with completing the ticket, a date/time of when the ticket was generated, details regarding the task to be performed according to the ticket, geographical information associated with any equipment to be serviced, and other similar information. Based on such data, various statistical or other analyses may be conducted to identify trends or potentially problematic elements of the disconnection process. For example, if the collected data indicates that incomplete disconnections predominantly occur with a particular type of network equipment, a network operator may reevaluate how personnel are trained to disconnect such equipment or determine whether the current disconnection process is missing one or more critical steps. Similarly, if the collected data indicates that a significant or disproportionate number of incomplete disconnections are associated with a particular employee, the employee may be identified to participate in additional training or, in certain extreme cases, termination.

The disconnection verification computing device 144 may also be configured to automatically generate and distribute reports regarding incomplete disconnections. Such reports may include tables, graphs, or other data representations corresponding to service disconnections. The reports may be automatically generated and distributed by the disconnection verification computing device 144 according to a predetermined schedule or in response to certain events, such as the identification of a predetermined number of incomplete disconnections.

In certain implementations, the disconnection verification computing device 144 may be configured to perform periodic audits/verifications of some or all of a network or sub-network over which network services are provided. To do so, the disconnection verification computing device 144 identifies services that should have been disconnected over a period of time and, for each such service, determines whether such services are, in fact, disconnected. As previously discussed, for example, for each network service that should be disconnected, the disconnection verification computing device 144 may identify each network device and/or port along a network service path previously used to provide the service. For each network device and/or port, the disconnection verification computing device 144 may then retrieve port configuration data from the corresponding network device and, based on the port configuration data, determine the status of ports along the service path. The status may indicate, among other things, that the port has actually been freed for reuse to provide another service, that the port is being used to provide a different network service, that the port has been placed on hold, or that the port is incorrectly still assigned to the disconnected network service. Based on the status, the disconnection verification computing device 144 may initiate remedial actions, such as reconfiguring the network device to free the port.

Figure 4:
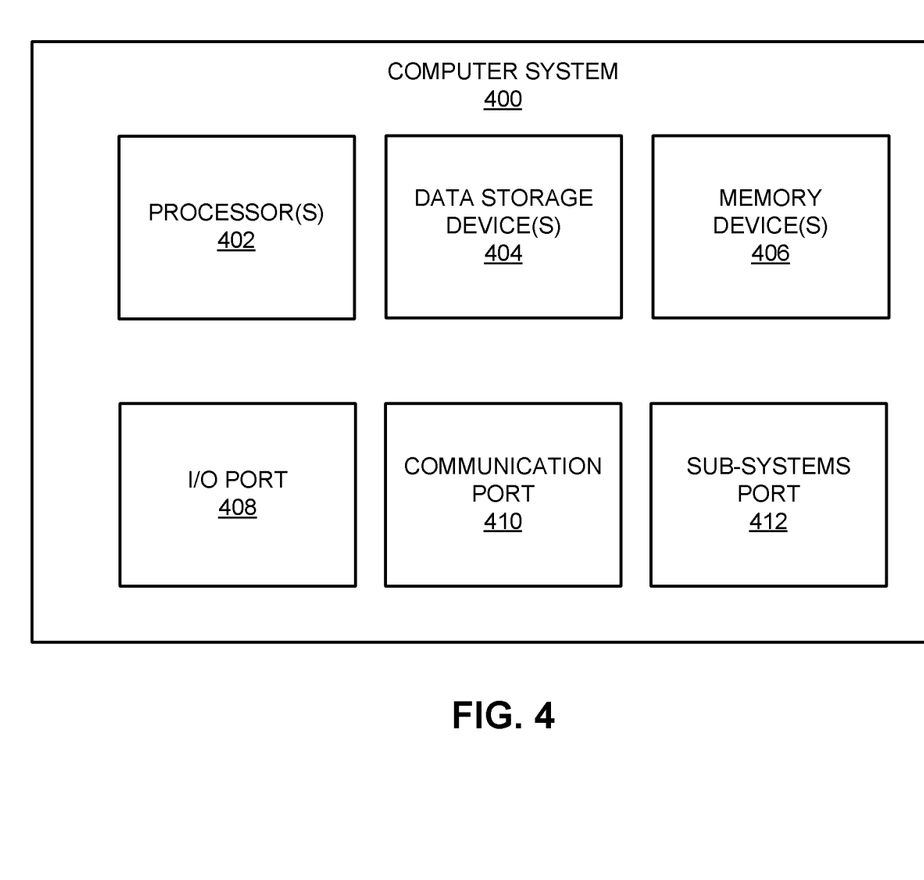
FIG. 4 is an example computing system that may implement various systems and methods of the presently disclosed technology.

Referring to FIG. 4, a schematic illustration of an example computing system 400 having one or more computing units that may implement various systems and methods discussed herein is provided. It will be appreciated that specific implementations of these devices may be of differing possible specific computing architectures not all of which are specifically discussed herein but will be understood by those of ordinary skill in the art.

The computer system 400 may be a computing system capable of executing a computer program product to execute a computer process. Data and program files may be input to computer system 400, which reads the files and executes the programs therein. Some of the elements of the computer system 400 are shown in FIG. 4, including one or more hardware processors 402, one or more data storage devices 404, one or more memory devices 408, and/or one or more ports 408-412. Additionally, other elements that will be recognized by those skilled in the art may be included in the computing system 400 but are not explicitly depicted in FIG. 4 or discussed further herein. Various elements of the computer system 400 may communicate with one another by way of one or more communication buses, point-to-point communication paths, or other communication means not explicitly depicted in FIG. 4.

The processor 402 may include, for example, a central processing unit (CPU), a microprocessor, a microcontroller, a digital signal processor (DSP), and/or one or more internal levels of cache. There may be one or more processors 402, such that the processor 402 comprises a single central-processing unit, or a plurality of processing units capable of executing instructions and performing operations in parallel with each other, commonly referred to as a parallel processing environment.

The computer system 400 may be a conventional computer, a distributed computer, or any other type of computer, such as one or more external computers made available via a cloud computing architecture. The presently described technology is optionally implemented in software stored on data storage device(s) 404, stored on memory device(s) 406, and/or communicated via one or more of the ports 408-412, thereby transforming the computer system 400 in FIG. 4 to a special purpose machine for implementing the operations described herein. Examples of the computer system 400 include personal computers, terminals, workstations, mobile phones, tablets, laptops, personal computers, multimedia consoles, gaming consoles, set top boxes, and the like.

One or more data storage devices 404 may include any non-volatile data storage device capable of storing data generated or employed within the computing system 400, such as computer executable instructions for performing a computer process, which may include instructions of both application programs and an operating system (OS) that manages the various components of the computing system 400. Data storage devices 404 may include, without limitation, magnetic disk drives, optical disk drives, solid state drives (SSDs), flash drives, and the like. Data storage devices 404 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. One or more memory devices 406 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 404 and/or the memory devices 406, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 400 includes one or more ports, such as an input/output (I/O) port 408, a communication port 410, and a sub-systems port 412, for communicating with other computing, network, or vehicle devices. It will be appreciated that the ports 408-412 may be combined or separate and that more or fewer ports may be included in the computer system 400.

The I/O port 408 may be connected to an I/O device, or other device, by which information is input to or output from the computing system 400. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 400 via the I/O port 408. Similarly, the output devices may convert electrical signals received from the computing system 400 via the I/O port 408 into signals that may be sensed as output by a human, such as sound, light, and/or touch. The input device may be an alphanumeric input device, including alphanumeric and other keys for communicating information and/or command selections to the processor 402 via the I/O port 408. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 400 via the I/O port 408. For example, an electrical signal generated within the computing system 400 may be converted to another type of signal, and/or vice-versa. In one implementation, the environment transducer devices sense characteristics or aspects of an environment local to or remote from the computing device 400, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example the computing device 400, such as, physical movement of some object (e.g., a mechanical actuator), heating or cooling of a substance, adding a chemical substance, and/or the like.

In one implementation, a communication port 410 is connected to a network by way of which the computer system 400 may receive network data useful in executing the methods and systems set out herein as well as transmitting information and network configuration changes determined thereby. Stated differently, the communication port 410 connects the computer system 400 to one or more communication interface devices configured to transmit and/or receive information between the computing system 400 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via communication port 410 to communicate one or more other machines, either directly over a point-to-point communication path, over a wide area network (WAN) (e.g., the Internet), over a local area network (LAN), over a cellular (e.g., third generation (3G) or fourth generation (4G)) network, or over another communication means. Further, the communication port 410 may communicate with an antenna for electromagnetic signal transmission and/or reception.

The computer system 400 may include a sub-systems port 412 for communicating with one or more external systems. Such systems may, for example, be associated with a vehicle and may control an operation of the vehicle and/or exchange information between the computer system 400 and one or more sub-systems of the vehicle. Examples of such sub-systems include, without limitation, imaging systems, radar, lidar, motor controllers and systems, battery systems, fuel cell or other energy storage systems, or controls in the case of vehicles with hybrid or electric motor systems, autonomous or semi-autonomous processors and controllers, steering systems, brake systems, light systems, navigation systems, environment controls, entertainment systems, and the like.

The system set forth in FIG. 4 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended thereto.

We claim:

1. A method of disconnecting a network service provided over a network service path using a computing device including a processor, the method comprising:

obtaining, by the computing device, a service identifier assigned to the network service;

identifying, using the processor, a port of a network device included in the network service path using the service identifier;

transmitting a request to the network device for port configuration data of the network device;

receiving, at the computing device and in response to the request, the port configuration data of the network device;

determining, using the processor, that the port is assigned to the network service from the port configuration data; and executing, using the computing device, a remediation operation in response to determining the port is assigned to the network service, the remediation operation including transmitting a reconfiguration command to the network device, wherein the reconfiguration command is adapted to cause the network device to update the port configuration data to free the port, wherein the port configuration data includes a port status indicating the port is one of active and inactive and determining the port is assigned to the network service comprises determining the port is active based on the port status.

2. The method of claim 1, wherein the request for the port configuration data includes at least one command executable by the network device that causes the network device to retrieve the configuration data from a memory of the network device, generate a configuration data response message including the configuration data, and transmit the configuration data response message to the computing device.

3. The method of claim 1, wherein the port configuration data includes cross-connection data indicating cross-connections between sets of ports of the network device and determining the port is assigned to the network service comprises determining the port is included in the cross-connection data.

4. The method of claim 1 further comprising determining that the port has not been reassigned to a second network service.

5. The method of claim 4, wherein determining that the port has not been reassigned to the second network service comprises one or more of: determining, by performing a lookup of the port in a port inventory, that the port is not used to provide the second network service, the port inventory correlating ports of network devices to service identifiers of network services provided by the ports of network devices, and determining that a port label included in the port configuration data does not include a second service identifier assigned to the second network service, the second service identifier being different from the service identifier received by the computing device.

6. The method of claim 1 further comprising determining a hold has not been placed on the port.

7. The method of claim 6, wherein determining whether a hold has been placed on the port comprises one or more of: querying a hold list using a port identifier assigned to the port, the hold list including port identifiers for ports placed on hold, and determining that a port label of the port included in the port configuration data does not indicate the port is placed on hold.

8. The method of claim 1 further comprising: generating a remediation ticket identifying at least one of the network device or the port; and transmitting the remediation ticket to a remote computing device.

9. The method of claim 1, wherein identifying the port of the network device comprises querying an inventory using the service identifier, the inventory including entries for at least one of a list of network devices or a list of network ports, each entry including a service identifier for a service provided using the network device or the port corresponding to the entry.

10. The method of claim 9, wherein executing the remediation operation further comprises updating an entry of the inventory corresponding to at least one of the network device or the port by removing the respective service identifier of the entry.

11. The method of claim 10, wherein the configuration data includes cross-connection data identifying a second port cross-connected to the port, and executing the remediation operation further comprises updating a second entry of the inventory corresponding to at least one of the second port or a second network device associated with the second port by removing the respective service identifier of the second entry.

12. The method of claim 1, further comprising: calculating a transport cost associated with a circuit including the port; and assigning a remediation rank to the remediation operation based, at least in part, on the transport cost.

13. The method of claim 12, wherein the remediation operation is one of a plurality of remediation operations, each remediation operation of the plurality of mediation operations being assigned a respective remediation rank, and wherein the plurality of remediation operations are executed in an order based on their respective remediation rank.

14. A method of disconnecting network services provided over one or more networks, each network service associated with a service identifier, the method executable by a computing device communicatively coupled to the one or more networks, the method comprising:

for each network service:
retrieving network service path data for a network service path previously used to provide the disconnected network service, the network path data including a port identifier corresponding to a port along the network service path;
identifying a network device including the port by querying an inventory database using the port identifier, the inventory database storing a list of network devices and port identifiers associated with each of the network devices;
transmitting a request to the network device, the request configured to automatically cause the network device to retrieve port configuration data of the network device and transmit the port configuration data to the computing device;
receiving, in response to transmitting the request, the port configuration data;
determining from the port configuration data that the port is still assigned to provide the disconnected network service; and
in response to determining the port is still assigned to the network service, transmitting a reconfiguration command to the network device, wherein the reconfiguration command is adapted to cause the network device to update the port configuration data to free the port, wherein the port configuration data includes a port status indicating the port is one of active and inactive and determining the port is assigned to the network service comprises determining the port is active based on the port status.

15. The method of claim 14 further comprising: determining from the port configuration data that the port is cross-connected to a second port; and reconfiguring the network device to update the port configuration data to free the second port.

16. A system for disconnecting network services in a telecommunications network, the system comprising: a computing device communicatively couplable to a plurality of storage systems and a network for providing network services, the computing device configured to:

obtain a service identifier assigned to the network service;

identify a port of a network device included in the network service path using the service identifier;

transmit a request to the network device for port configuration data of the network device;

receive, in response to the request, the port configuration data of the network device;

determine that the port is assigned to the network service from the port configuration data; and execute a remediation operation in response to determining the port is assigned to the network service, the remediation operation including transmitting a reconfiguration command to the network device, wherein the reconfiguration command is adapted to cause the network device to update the port configuration data to free the port, wherein the port configuration data includes a port status indicating the port is one of active and inactive and determining the port is assigned to the network service comprises determining the port is active based on the port status.

* * * * *